Patented Apr. 20, 1943

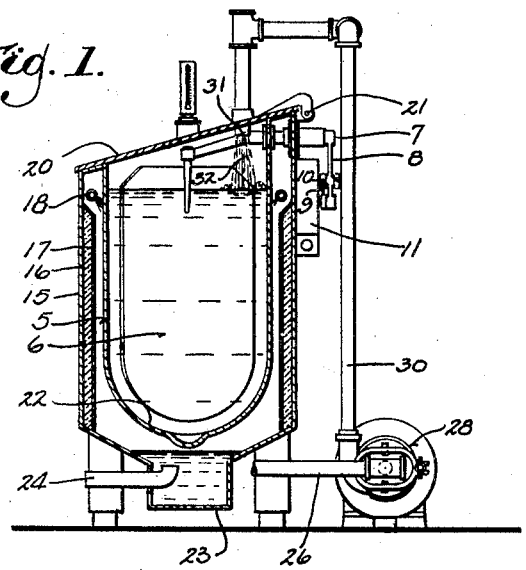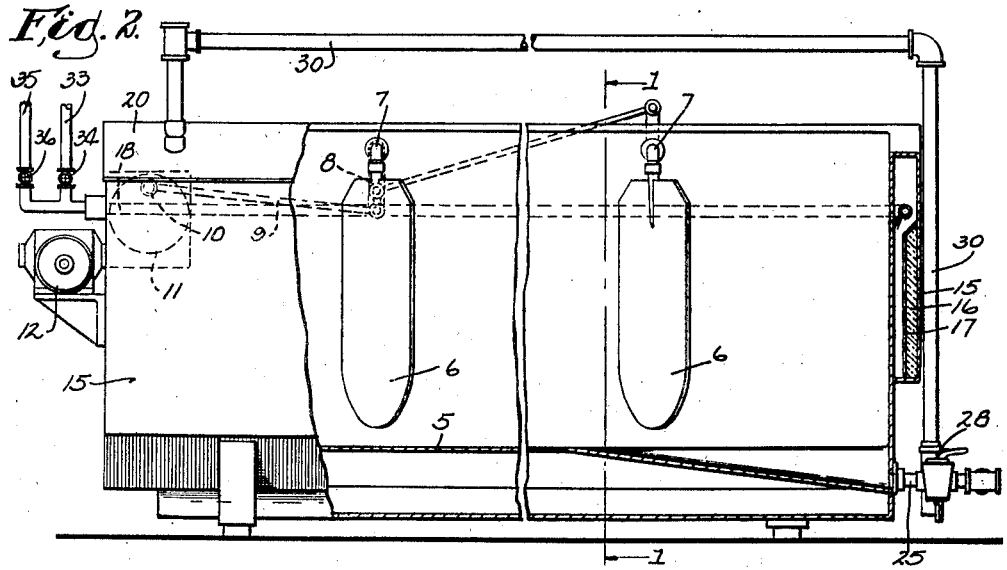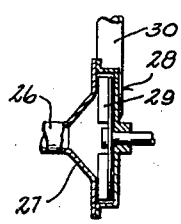

2,317,045

UNITED STATES PATENT OFFICE 2,317,045

APPARATUS FOR PRODUCTION OF ARTIFICIALLY CULTURED BUTTERMILK

Harold S. Fielder, La Grange, Ill., and Latour O. Ott, Los Angeles, Calif., assignors to Cherry-Burrell Corporation, Wilmington, Del., a corporation Original application December 1, 1937, Serial No. 177,400. Divided and this application February 28, 1940, Serial No. 321,170

4 Claims. (Cl. 99—264)

This invention relates to improvements in apparatus for producing butter flakes in a dairy product containing butter fat.

This application is a division of our co-pending application Serial No. 177,400, filed December 1, 1937, for method and apparatus for production of artificially cultured buttermilk, which matured into United States Patent No. 2,209,516 dated July 30, 1940.

The object of the invention include the provision of a novel and improved apparatus for securing and maintaining a proper size of butter flake in buttermilk by the churning of a dairy product containing butter fat in and by the improved apparatus.

A further object of the invention is the provision of apparatus for churning which prevents the coagulation or agglomeration of butter fat flakes, thereby maintaining them in a desired size and condition and also preventing the separation of the cultured buttermilk.

More particularly it is the purpose of this invention to provide apparatus combining hydraulic and mechanical impact means to effect churning of the butter flakes all within the same container or tank in which the material being churned was processed preparatory to churning.

In the drawing:

Figure 1 is a view showing in transverse section the apparatus used in the practice of this invention.

Figure 2 is a view showing the apparatus in longitudinal section.

Figure 3 is a view showing in axial section the special circulating and agitating pump employed in connection with this invention.

Like parts are identified by the same reference characters throughout the several views.

In accordance with this invention special equipment is preferably used to enable buttermilk to be processed and churned complete in one receptacle. The apparatus preferably comprises an inner tank 5 in which a broad paddle 6 is suspended for oscillation upon the shaft 7. The shaft 7 carries a crank 8 outside of the tank connected by a link or pitman 9 with the crank 10 of a speed reducer 11 operated by motor 12.

The external jacket 15 completely surrounds the tank 5 in spaced relation thereto and is heavily insulated against heat transfer by the layer of insulation 16 which is held in place by an intermediate lining 17 in spaced relation to tank 5. The layer of insulation and the intermediate lining 17 terminate short of the top of the tank 5 and above them is disposed a pipe 18 extending completely about the wall of the tank 5 and provided with nozzle orifices for directing jets of water or steam against the exterior surfaces of tank 5. The upper margins of tank 5 are carried over the upper margins of jacket 15 to enclose the space in which the pipes 18 operate, and a cover 20 hinged at 21 is provided to give access to the interior of the tank.

The tank 5 preferably has a cylindrical bottom at 22 beneath which the jacket 15 is provided with a sump 23 from which the water or other fluid flowing down the exterior surfaces of tank 5 may be withdrawn through the discharge pipe 24.

The tank 5 is provided at one of its ends with a large outlet at 25 communicating through pipe 26 with the conical inlet chamber 27 of a centrifugal pump generically designated by reference character 28. The purpose of providing the flaring inlet chamber 27 is to enable the incoming liquid to pass beyond the "eye" of the pump impellor or runner 29 into the path of the impellers to receive directly the impeller impact. In an ordinary milk handling pump every effort is made to avoid such impact, but in the present case the impact produces desirable agitation and mechanical impact to cause or bring about a churning or agglomerating effect upon the butter fat globules in the product being circulated through the pump to aid in producing small butter flakes. In this connection it is interesting to note that too small a pump will not be effective to accomplish this result. The runner must have substantial size in order to produce the smoothing and aid the churning effect upon the liquid which is a desirable objective of the invention.

The discharge pipe 30 leading from the pump 28, as shown in the figures, passes to the end of the tank 5 opposite to that from which the liquid was withdrawn through the outlet 25. It is, however, not essential that this particular arrangement be followed. Instead pipe 30 may lead from pump 28 to any other portion of the top of the tank 5.

It is, however, desired that the pipe 30 terminate at 31 at a point which is preferably at least a foot above the level of the liquid in the tank 5. The hydraulic impact of the liquid stream 32 with the liquid remaining in the tank 5 is a very important factor in bringing about the desired churning effect, whereby the butter fat globules in the liquid are caused to agglomerate and form small butter flakes. A further desirable effect of this hydraulic impact is to produce a smooth homogeneous character in the entire liquid product contained in the tank.

In the stream of liquid being discharged from the end of the pipe 30 and impinged against the surface of the liquid in the vat 5 to produce the hydraulic impact desired, as indicated above, certain undesirable quantities of air may be unavoidably entrained. To avoid this situation the agitating paddles 6 are maintained in operation during the recirculation of the liquid through the pump 28 to thereby expel the entrained air from the contents of the tank 5. This procedure brings about a reduction in the quantity of foam on the surface of the liquid in the tank.

The complete method involved in the use of the above described apparatus for the processing of buttermilk is as follows:

Skimmed milk is standardized with separated cream to add to the skimmed milk one-half per cent to one per cent butter fat. The total solids are reduced to approximately eight and two-tenths per cent by adding water. The batch is heated to approximately 185° F. by delivering steam or hot water into pipe 18 from the hot line 33 through valve 34. The heating will, in a machine of conventional size, require about fifty minutes and the temperature should be held at the approximate degree stated for approximately thirty minutes.

Thereupon cold or refrigerated water is introduced into the spray pipe 18 from the cold line 35 through valve 36 to chill the batch to as low a temperature as the temperature of the water will permit, or at least to 72° F. The cooling time in apparatus of ordinary size will be approximately sixty minutes.

Two and one-half per cent to three per cent of .87 acid starter is now added to the batch and the batch is mixed thoroughly. The swinging paddle or paddles in the vat 5 may be used for this purpose. The produce is then allowed to stand for approximately fourteen hours, or until the desired acidity is reached. Ordinarily this will lie within a range of .77 to .85 acidity.

At this time it is desired to add butter color to give higher color to the butter granules. The paddles are then set in operation at one-half stroke to break up the curd and enough refrigerated water is circulated through the spray pipes to cool the batch to approximately 68° F. for churning.

The pump is now set in operation. The pump has been but briefly described heretofore. It may conveniently correspond to the disclosure of U. S. Patents 1,328,061 and 1,697,487 modified to provide the flaring inlet aforesaid. The outlet valve at 25 is opened full and the product is recirculated through pipe 26, pump 28, and pipe 30 until the churning is completed and the proper size of butter granule and texture is attained. This will require from fifteen minutes to thirty minutes, depending on the amount of butter fat used.

The discharge of the material through space from the terminus 31 of pipe 30 onto the relatively stationary remaining mass of liquid in the tank 5 results in hydraulic impact or concussion which is desirable in bringing about the agglomeration of butter fat globules to form butter flakes. In effect the batch in the tank 5 is divided by the continuous withdrawal of material from the tank by the pump 28. The quantity of material so withdrawn by the pump 28 is continuously and concussively impacted against the upper surface of the material remaining in the vat.

The concurrent and cooperative action of the paddles of the pump runner 29 upon the material circulating through the pump and the hydraulic concussion of that same portion of the material after passing through the pump against the remaining portion of the material in the tank 5 produces the desired texture and churning effect. This concurrent and cooperative action, as just described, also reduces the size of the fat globules so that small dimensioned butter flakes may be formed therefrom.

When the proper size and quantity of butter flake is obtained the batch is cooled in the tank by circulating refrigerated water through the spray pipes 18 in a sufficient quantity to reduce the temperature of the batch approximately 45° F. or 50° F. The paddles 6 are maintained in operation at one-half stroke during this cooling operation to thereby expel any remaining undesired quantities of air entrained in the liquid in the tank during the churning operation. This cooling operation, as just described, will require about one and one-half hours. The product, after cooling, may then be held in the tank until ready for bottling or it may be drawn off into cans and held in a refrigerator if desired.

It will, of course, be understood by those skilled in the art that the temperatures and periods of time and acid and butter fat content, as stated above, are given merely by way of example and with no intent to limit the invention in any such respect. The initial heating is merely a conventional pasteurization step, and the process upon which novelty is predicated herein is largely concerned with the mechanical and hydraulic treatment of the material by circulating it under the conditions stated.

The buttermilk so produced has a finer size of butter granule than the conventional type of buttermilk heretofore available. The butter granules produced in the buttermilk in the manner as just previously described stay in suspension better than the butter granules produced by previous methods of churning butter and buttermilk. A product of improved flavor also results from the elimination of air therefrom, as well as from the speedy completion of the entire process in a single container and the associated pipe and pumps.

In the apparatus just described it has been found desirable to use materials substantially non-corrosive, such, for example, as stainless steel. The apparatus as described, including the vat in which the entire processing of the product may be carried out and the centrifugal pump particularly designed to produce mechanical impacting or working of the product being processed, lends itself especially well to the working of the process set forth previously in the specification.

It will, of course, be obvious to those skilled in the art that various modifications in the details of construction of the apparatus heretofore described may be made within the scope of the invention and it is not desired to limit the claims to the particular apparatus disclosed.

The invention is hereby claimed as follows:

1. A device of the character described comprising a vat having a circulation pipe connected between a discharge point of said vat and a point above the level of a normal batch of contents therein, and a pump for circulating through said pipe the material of the batch, said pump and said pipe being of such capacities as to subject the material being circulated to violent impact upon the discharge of the material from said pipe.

2. A device of the character described comprising the combination with a vat having a discharge opening, of a circulating pump, a pipe connecting said opening with said pump, and a discharge pipe extending from said pump to a point in said vat above the level of its contents, said pump and said pipe being of such capacities as to subject the material being circulated to violent impact upon the discharge of the material from said pipe.

3. A device of the character described comprising the combination with a vat, of an insulated enclosing shell, means within said shell for directing cooling and heating liquids on the exterior surface of the vat, said vat having a discharge opening, a pump having its inlet connected with said opening, and a discharge pipe leading from said pump to a point above the level of a batch of material in said vat, together with paddle means for de-aerating said material and mechanism for the operation of said paddle means during the recirculation of material by said pump, said pump and said pipe being of such capacities as to subject the material being circulated to violent impact upon the discharge of the material from said pipe.

4. The combination with an external shell provided with insulated walls and a cover, of a vat mounted within the shell and provided with a cylindrical bottom, a sump extending longitudinally of the shell beneath the bottom of the vat, said vat being spaced within the shell, means for spraying heating and cooling fluids on the external surface of the vat within said shell adjacent the top of the vat to flow over said external surfaces to said sump, an impeller type circulating pump having an inlet, said vat having a discharge port in communication with said inlet, a return pipe from said pump to a point above the level of the contents of said vat for the recirculation to the vat of material withdrawn therefrom by the pump, paddle means substantially conforming in size and shape to the cross section of the vat for the de-aeration and agitation of the contents thereof, and a conical inlet chamber for said pump communicating with the pump chamber at points remote from the eye of the impeller, whereby to subject recirculated material to mechanical impact by said impeller, said pump and said pipe being of such capacities as to subject the material being circulated to violent impact upon the discharge of the material from said pipe.

HAROLD S. FIELDER.
LATOUR O. OTT.